US012742349B2

(12) United States Patent
Koniki et al.

(10) Patent No.: US 12,742,349 B2
(45) Date of Patent: Sep. 22, 2026

(54) SYSTEM AND METHOD FOR CONTROLLING MULTIPLE LATCHES

(71) Applicant: BROSE FAHRZEUGTEILE SE & CO. KOMMANDITGESELLSCHAFT, BAMBERG, Bamberg (DE)

(72) Inventors: Sai Koniki, Farmington Hills, MI (US); Ben Carter, Waterford, MI (US); Bobby Seid, Bloomfield Township, MI (US); Tanay Banerjee, Pune (IN); Mario Recio, Rochester Hills, MI (US); Michael Hassel, Coburg (DE); Oliver Suchanek, Bamberg (DE)

(73) Assignee: BROSE FAHRZEUGTEILE SE & CO. KOMMANDITGESELLSCHAFT, BAMBERG (DE)

( * ) Notice: Subject to any disclaimer, the term of this patent is extended or adjusted under 35 U.S.C. 154(b) by 148 days.

(21) Appl. No.: 18/763,175

(22) Filed: Jul. 3, 2024

(65) Prior Publication Data

US 2026/0009276 A1 Jan. 8, 2026

(51) Int. Cl.

| | |
|---|---|
| ***E05F 15/63*** | (2015.01) |
| ***E05B 81/06*** | (2014.01) |
| ***E05B 81/20*** | (2014.01) |
| ***E05B 81/58*** | (2014.01) |
| ***E05F 15/79*** | (2015.01) |

(52) U.S. Cl.

CPC .............. *E05F 15/63* (2015.01); *E05B 81/06* (2013.01); *E05B 81/20* (2013.01); *E05B 81/58* (2013.01); *E05F 15/79* (2015.01); *E05Y 2400/415* (2013.01); *E05Y 2900/544* (2013.01); *E05Y 2900/546* (2013.01)

(58) Field of Classification Search

CPC ......... E05F 15/63; E05F 15/79; E05F 15/622; E05B 81/06; E05B 81/20; E05B 81/58; E05Y 2400/415; E05Y 2900/544; E05Y 2900/546

See application file for complete search history.

(56) References Cited

U.S. PATENT DOCUMENTS

2005/0184534 A1* 8/2005 Oberheide .............. E05B 81/14 292/201
2014/0277938 A1* 9/2014 Utter ........................ E05B 77/48 701/36
2020/0131808 A1* 4/2020 Kim ......................... E05B 81/06

* cited by examiner

*Primary Examiner* — Abdhesh K Jha
*Assistant Examiner* — Alexander George Matta
(74) *Attorney, Agent, or Firm* — Dickinson Wright PLLC

(57) ABSTRACT

A method for operating each of the latches in the drive arrangement provided with three latch motors interconnected by four half-bridges. The method includes the steps of determining whether a predetermined period is passed to control each of the motors, determining whether a second predetermined period is passed to control each of the motors after the first predetermined period is passed, measuring current in each of the motors for actuation when the first and second predetermined periods are each passed, determining whether the measured current is less than a predetermined threshold value, and operating each of the motors to perform a cinch operation of each of the latches when the measured current is less than the predetermined threshold value.

13 Claims, 10 Drawing Sheets

SYSTEM AND METHOD FOR CONTROLLING MULTIPLE LATCHES

TECHNICAL FIELD

The present disclosure relates to a system and method for controlling operation of a splitgate door in a vehicle. More particularly, the present disclosure relates to the system and method for controlling a multiple latches in the splitgate door in the vehicle.

BACKGROUND

The statements in this section merely provide background information related to the present disclosure and may not constitute prior art.

Vehicles typically include closures that provide access to the vehicle. In particular, a five door vehicle, such as but not limited to a station wagon, sport utility vehicle (SUV), cross-over vehicle (XUV), van, etc., may include a single tailgate closure at a rear of the vehicle. A drive arrangement of the single tailgate enclosure is a known technology for controlling the single tailgate enclosure. In this case, the drive arrangement is generally equipped with a drive controller for realizing a respectively predefined desired closure adjustments by means of at least one drive.

With the requirement for increased flexibility of use, in recent year, the vehicles have been increasingly been equipped with two tailgate closures to provide access to a passenger compartment. The two tailgate closures include an upper enclosure and a lower enclosure, which are pivotable about two spaced-apart, parallel pivot axes. The basic possibility of separately adjusting the two enclosures does indeed result in a considerable increases in the flexibility of use. However, the possibility also imposes additional components to control the enclosures on the drive arrangement if a powered adjustment of the enclosures is desired to operate the two tailgate enclosures. Accordingly, an improved system and method may be desired to control operation of the two tailgate enclosures based on a variety of condition and also reduce parts and cost of the drive arrangement.

SUMMARY

One general aspect of the present disclosure includes a drive arrangement system for use with vehicle enclosures, pivotally coupled to a vehicle body and movable from an open position to a closed position. According to an exemplary form of the present disclosure, a drive arrangement for a splitgate system having an upper gate and a lower gate for a vehicle includes an upper latch included in the upper gate and operatively connected with an upper latch motor, a first lower latch included in the lower gate and operatively connected with a first lower latch cinching motor, a second lower latch included in the lower gate and operatively connected with a second lower latch cinching motor, and a controller configured to operate each of the upper latch motor, the first lower latch cinching motor, and the second lower latch cinching motor to perform a cinch operation of the upper latch, the first lower latch, and the second lower latch. Further, the upper latch motor, the first lower latch cinching motor, and the second lower cinching motor are operatively interconnected to one another to control a rotational direction of the motors such that each of the three motors uses a respective half-bridge connection and a common half-bridge connection to make a H-bridge connection.

According to a further aspect of the present disclosure, the upper latch motor, the first lower latch cinching motor, and the second lower latch cinching motor are operatively interconnected with eight (8) MOSFETs to control the rotational direction of each motor.

According to a further aspect of the present disclosure, in the cinch operation, the controller is configured to switch on a high voltage (H) in the respective half-bridge connection of the motors and a low voltage (L) in the common half-bridge connection such that current flows toward the common half-bridge connection from each of the half-bridge connections to operate the motors. In the cinch operation, further, each of the motors runs in a clockwise (CW) direction such that the latches are moved to a primary position from a secondary position.

According to a further aspect of the present disclosure, the controller is further configured to operate each of the motors to perform a rewind operation for resetting a position of the motors. In the rewind operation, a rotational direction of the motors is an opposite from the rotational direction of the motors in the cinch operation. Further, in the rewind operation, the controller is configured to switch on a low voltage (L) in the respective half-bridge connection of the motors and a high voltage (H) in the common half-bridge connection such that current flows toward the respective half-bridge connection of the motors from the common half-bridge connection. In the rewind operation, each of the motors runs in a counterclockwise (CCW) direction such that the latches are moved to a home position from a primary position.

According to a further aspect of the present disclosure, when the controller determines that a cinch operation of the upper latch starts in ongoing cinch operations of the first and second lower latches, the controller is configured to perform the cinch operations of the three latches.

According to a further aspect of the present disclosure, when the controller determines that a cinch operation of the upper latch starts in ongoing rewind operations of the first and second lower latches, the controller is configured to stop and wait the rewind operations of the first and second lower latches until the upper latch completes the cinch operation. Further, when the cinch operation of the upper latch is completed, the controller is configured to resume the rewind operations of the first and second lower latches and also perform a rewind operation of the upper.

According to a further aspect of the present disclosure, the drive arrangement includes a first lower latch releasing motor and a second lower latch releasing motor to unlock the respective first and second lower latches such that the first and second lower latches are moved to a secondary position from a primary position. The drive arrangement further includes a pair of upper spindle drives to move the upper gate between an open position and a closed position, and a pair of lower spindle drives to move the lower gate between an open position and the closed position.

According to another aspect of the present disclosure, a method for operating each of the latches in the drive arrangement includes the steps of determining whether a predetermined period is passed to control each of the motors, determining whether a second predetermined period is passed to control each of the motors after the first predetermined period is passed, measuring current in each of the motors for actuation when the first and second predetermined periods are each passed, determining whether the measured current is less than a predetermined threshold value, and operating each of the motors to perform a cinch operation of each of the latches when the measured current is less than the predetermined threshold value.

According to a further aspect of the present disclosure, the method further includes the step of operating each of the motors to perform a rewind operation of each of the latches after the cinch operation of the latches is completed. Each of the first and second predetermined period is around 40 msec, and the predetermined threshold value to actuate each of the motors is around 8A.

Further details and benefits will become apparent from the following detailed description of the appended drawings. The drawings are provided herewith purely for illustrative purposes and are not intended to limit the scope of the present disclosure.

The drawings described herein are for illustration purposes only and are not intended to limit the scope of the present disclosure in any way.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative bases for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical application. Various combinations and modifications of the features consistent with the teachings of this disclosure, however, could be desired for particular applications or implementations.

"A", "an", and "the" as used herein refers to both singular and plural referents unless the context clearly dictates otherwise. By way of example, "a processor" programmed to perform various functions refers to one processor programmed to perform each and every function, or more than one processor collectively programmed to perform each of the various functions.

Figure 1:
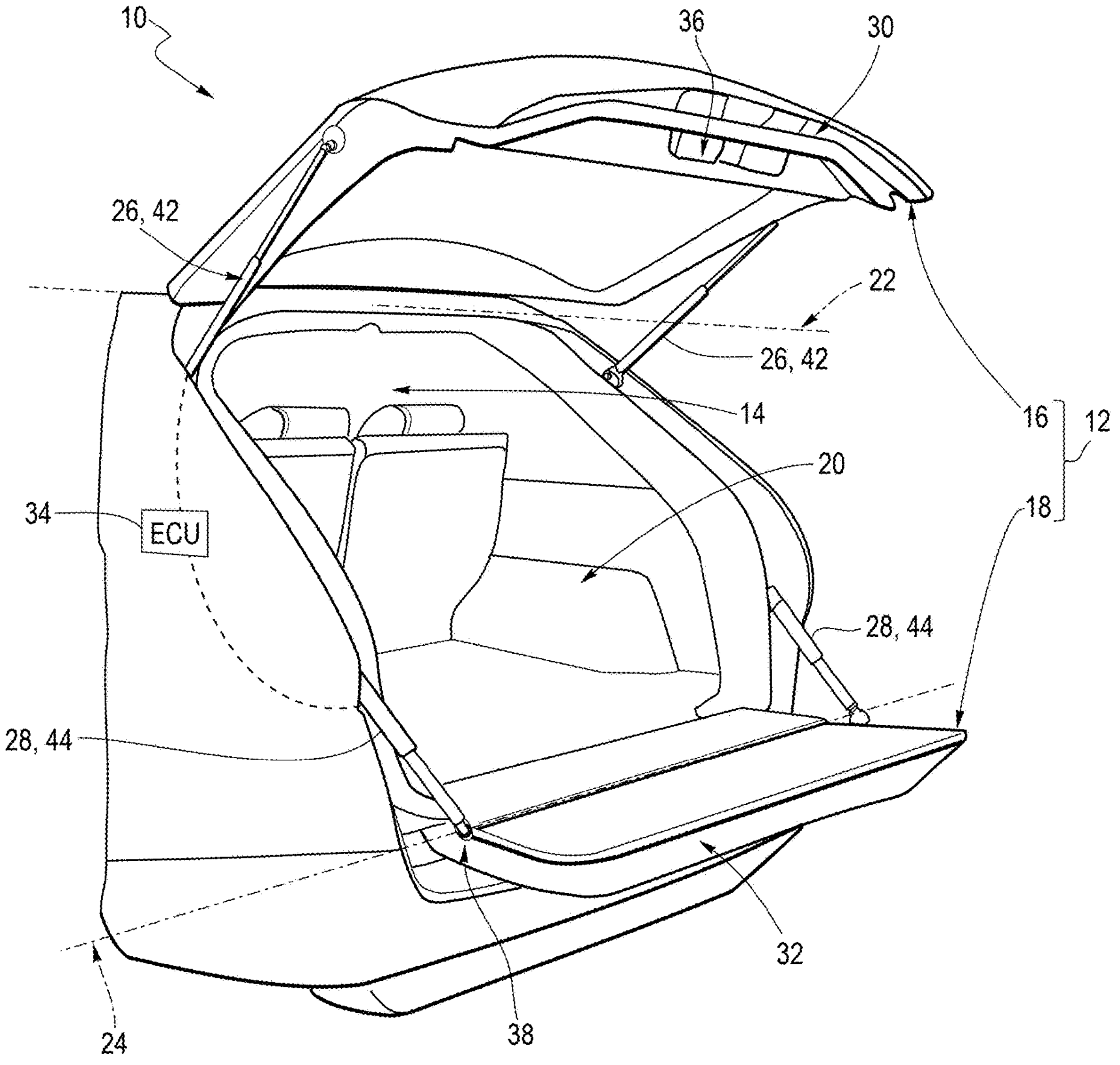
FIG. 1 is a rear perspective view of a vehicle illustrating an upper gate and a lower gate of a splitgate system of the vehicle in an open position in accordance with an exemplary form of the present disclosure.

FIG. 1 illustrates a rear portion of a vehicle 10 having a splitgate system, which is in an open position. It is contemplated that the vehicle 10 may be one of a variety of types of vehicles (e.g., SUV, crossover, truck, sedan, van, coupe, etc.), in various embodiments. For example, FIG. 1 shows the vehicle 10 including a cabin 14 for passengers, and two gates such as an upper gate 16 and a lower gate 18. The upper and lower gates 16 and 18 are operable between the open position and the closed position. As shown in FIG. 1, opening the upper gate 16 and/or the lower gate 18 may access to the cabin 14 of the vehicle 10, and particularly provide access to a cargo area 20 of the vehicle 10. The cargo area 20 may be an area of the vehicle 10 for receiving cargo for storage therein. For example, the vehicle 10 includes the rear cargo area 20 that is accessible via opening one of the upper and lower gates 16 and 18 of the vehicle 10. In some implementations, the cargo area 20 may be positioned outside of the cabin 14 of the vehicle 10. For example, the vehicle 10 may be a pickup truck, the cargo area 20 may be a bed of the truck (not shown), and the rear gate may be a tailgate of the truck that gives access to the bed. In another example, the vehicle 10 may be an electric vehicle, the cargo area 20 may be a front truck, and the gate may be a hood that is a movable to an open position to provide access to the front trunk (not shown).

In accordance with an exemplary embodiment of the present disclosure, the upper and lower gates 16 and 18 are each operable to pivot about an upper pivot axis 22 and a lower pivot axis 24 between the open and closed positions. It is contemplated that, in various embodiments, the upper and lower gates 16 and 18 are operable to move between the open and closed positions in at least one of a variety of ways (e.g., translation, sliding, pivoting, etc.). As shown in FIG. 1, for example, one or more gates 16 and 18 of the vehicle 10 are operable to be power actuated between the open and closed positions via operation of one or more actuators such as an upper actuator 26 and/or a lower actuator 28, which are each coupled to the vehicle 10. Various types of actuators 26 and 28 are configured to move the upper and/or lower gates 16 and 18 are contemplated (e.g., electric motor, piston (i.e., spindle), solenoid, etc.).

As shown in FIG. 1, the vehicle 10 includes a rear gate assembly 12 positioned at the rear portion of the vehicle 10. The rear gate assembly 12 is operable to selectively provide access to at least one of the cabin 14 of the vehicle 10 and the cargo area 20 of the vehicle 10. In some embodiments, the rear gate assembly 12 includes a single gate (not shown). For example, the rear gate assembly 12 may include a single trunk door operable to provide access to a trunk of the vehicle 10 in the open position. In another example, the rear gate assembly 12 may include a single tailgate of a truck operable to provide access to the bed of the truck in the open position. Further, in some example, the rear gate assembly 12 may include a single door lift gate that pivots to the open position to provide access to the storage area positioned within the cabin 14 of the vehicle 10 (not shown).

Figure 2A:
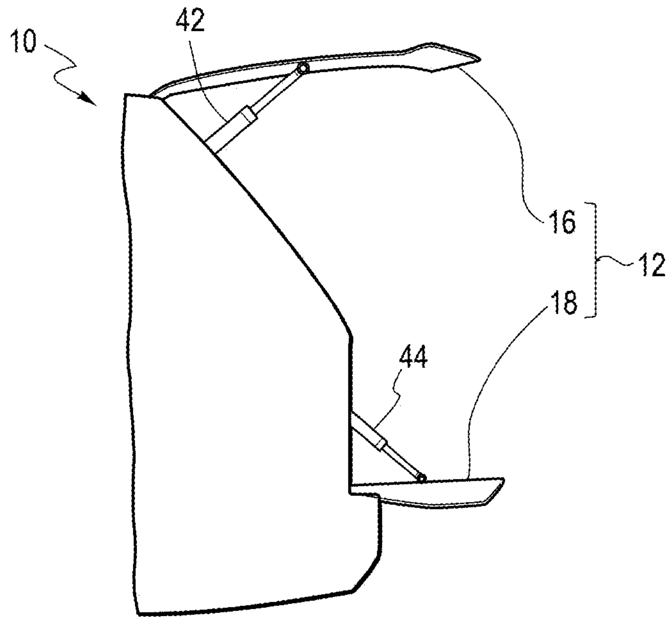
FIG. 2A is a side view of the splitgate system having the upper gate and the lower gate in the open position of FIG. 1.
Figure 2B:
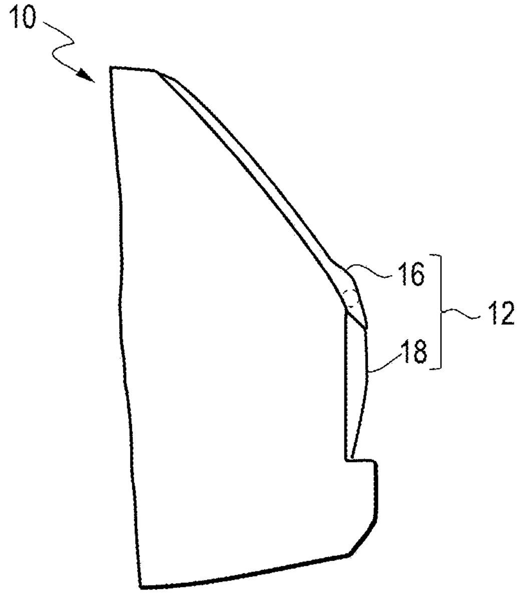
FIG. 2B is a side view of the splitgate system having the upper gate and the lower gate in a closed position of FIG. 1.

In FIG. 1, for example, the rear gate assembly 12 includes the splitgate system having an upper gate 16 and a lower gate 18 positioned in the vehicle-downward of the upper gate 16. Referring to FIGS. 2A and 2B, the upper gate 16 pivots a first direction (vehicle-upward) about the upper pivot axis 22 from the closed position to the open position. The lower gate 18 pivots a second direction (vehicle-downward) about the lower pivot axis 24 that is an opposite from the first direction of the upper gate 16 from the closed position to the open position. The upper gate 16 and the lower gate 18 are coupled to each other in their respective closed position.

As shown in FIGS. 1, 2A, and 2B, further, the upper gate 16 includes an upper distal end 30 that is located distally relative to the upper pivot axis 22 about which the upper gate 16 pivots between the open and closed positions. The lower gate 18 includes a lower distal end 32 that is located distally relative to the lower pivot axis 24 about which the lower gate 18 pivots between the open and closed positions. So, the upper and lower distal ends 30 and 32 of the upper and lower gates 16 and 18 are proximate and/or in contact with each other in the closed position of the upper and lower gates 16 and 18.

Referring back to FIG. 1, the splitgate system of the vehicle 10 is an electrically driven system configured to articulate the upper gate 16 and the lower gate 18 between the open and closed positions. In general, the upper and lower gates 16 and 18 are each automatically operated by the electrically driven system. For example, the upper gate 16 may be opened without opening the lower gate 18 (not shown), both of the upper and lower gates 16 and 18 may be opened at the same time (see FIG. 1), and the lower gate 18 may be opened without opening the upper gate 16 (not shown).

In FIG. 1, an electronic control unit (ECU) 34 (i.e., a controller) is included in the vehicle 10 to control the splitgate's opening and closing. The controller is configured to independently control movements of the upper and lower gates 16 and 18. So, this may include an upper module control sequence where the upper gate 16 is actuated to the open position while the lower gate 18 remains closed. Another gate control sequence may be a dual mode where both of the upper and lower gates 16 and 18 are simultaneously articulating.

Figure 3:
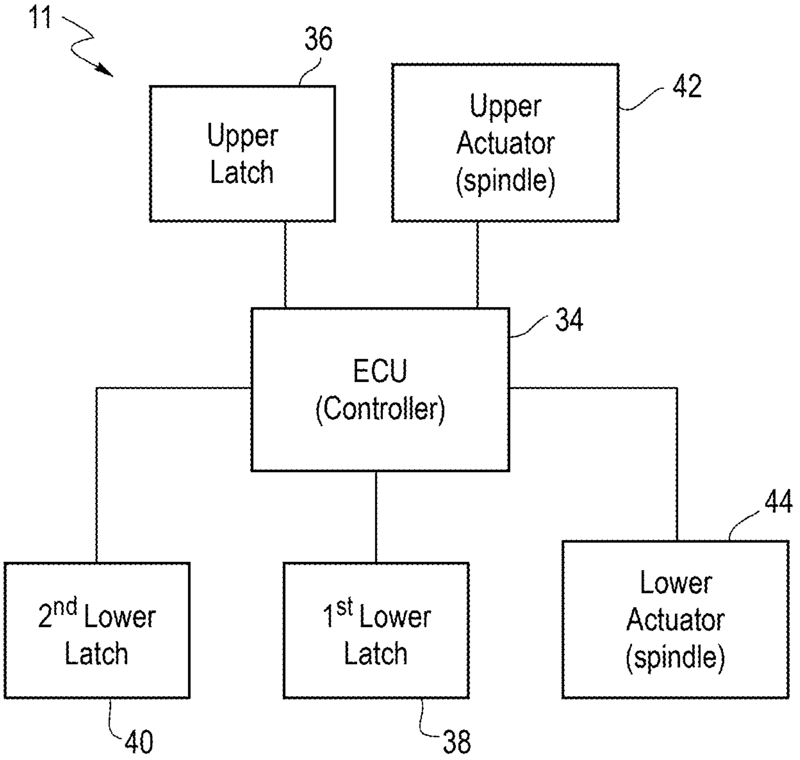
FIG. 3 is a block diagram showing an electronic control unit (ECU) communicating with latches and spindle drives in the splitgate system of FIG. 1.

FIG. 3 shows a block diagram of the ECU 34 to control the splitgate system 11 of the vehicle 10 in the present disclosure. As shown in FIG. 3, the splitgate system 11 includes an upper latch 36, the upper actuator 26, a first lower latch 38, a second lower latch 40, and the lower actuator 28. For example, each of the upper actuator 26 and the lower actuator 28 includes a pair of upper and lower spindle drives 42 and 44 (see FIG. 1). Each of the upper and lower spindle drives 42 and 44 includes a first end pivotally attached to the vehicle 10 and a second end pivotally attached to the upper and lower gates 16 and 18, respectively. Further, each of the upper and lower spindle drives 42 and 44 is operatively connected to respective bi-direction motors (i.e., an upper actuating motor 46 and a lower actuating motor 48) for controlling the upper and lower actuators 26 and 28 between the open position and closed position. The upper and lower spindle drives 42 and 44 are each configured to move from a retracted position to a deployed position. So when the each of the upper and lower gates 16 and 18 is in the open position as shown in FIG. 2A, each of the upper and lower spindle drives 42 and 44 is in the deployed position. When each of the upper and lower gates 16 and 18 is in the closed position as shown in FIG. 2B, each of the upper and lower spindle drives 42 and 44 moves to the retracted position.

In FIGS. 1 and 3, further, the upper gate 16 of the splitgate system 11 includes the upper latch 36, which is located at the upper distal end 30. The lower gate 18 of the splitgate system 11 includes the first lower latch 38, which is located at the left side of the lower gate 18 and the second lower latch 40, which is located at the right side of the lower gate 18. However, the locations of the latches 36, 38, and 40 are not limited to the identified locations above. In another approach, the locations of the latches 36, 38, and 40 may be changed to other locations according to the splitgate system's design.

In general, each of the upper, first lower, and second lower latches 36, 38, and 40 is configured to move or actuate from an unlocked position to a secondary position (i.e., the gates are partially closed (not shown)). At the secondary position, the controller continues to apply power to the latches for moving the latches to the primary position (i.e., the gates are fully closed) from the secondary position. So when each of the upper and lower spindle drives 42 and 44 actuates from the deployed position (i.e., the open position of the gates) to the retracted position (i.e., the partially closed position of the gates), the three latches 36, 38, and 40 are each actuated to move to the primary position (locked position) from the unlocked position via the secondary position.

Figure 4:
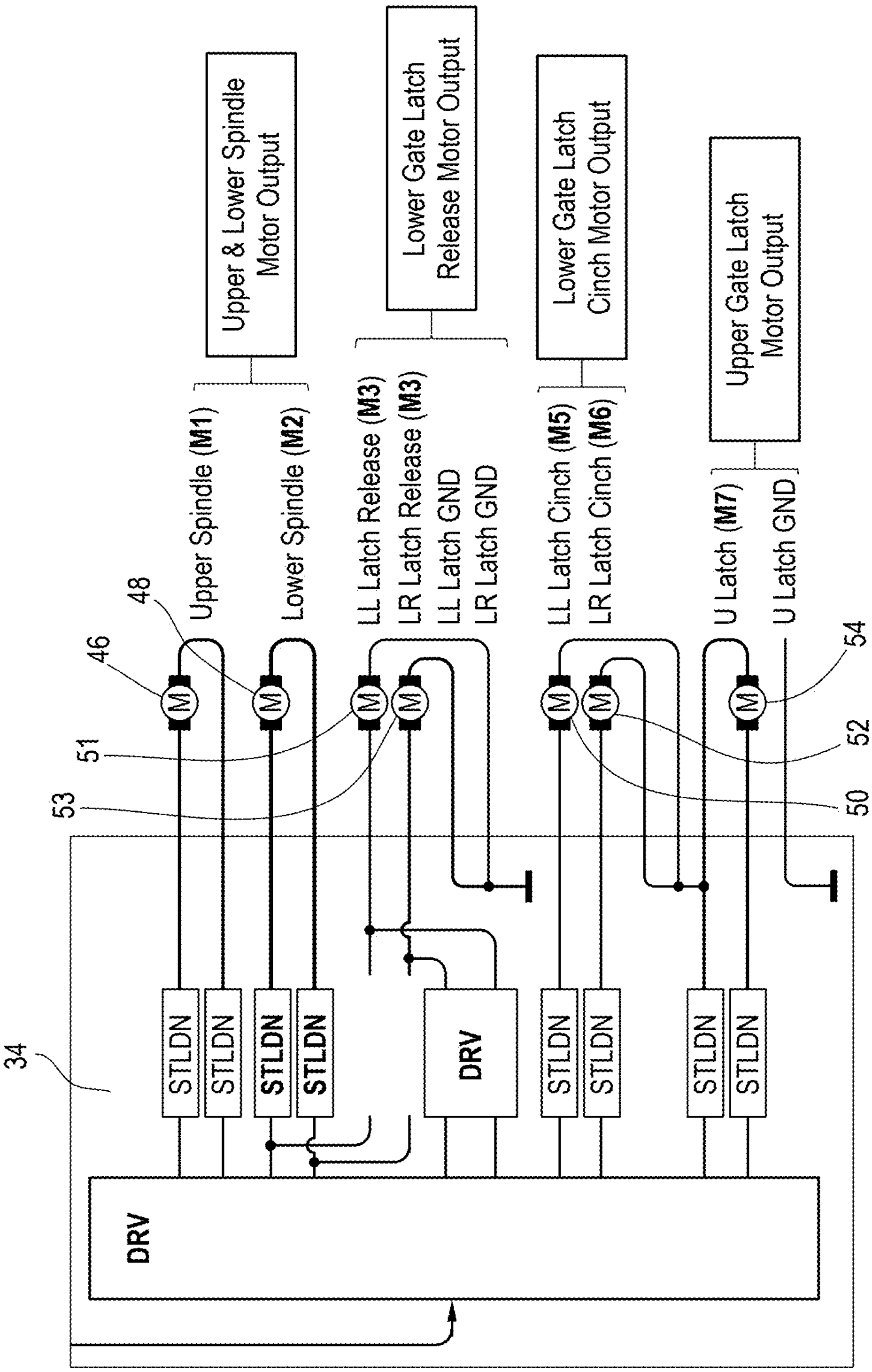
FIG. 4 is a portion of the ECU of the drive arrangement showing motors interconnected with MOSFETs.

Referring to FIG. 4, the ECU 34 is communicated with a plurality of electric motors to control the latches 36, 38, and 40 between the cinch operation and the release operation. As shown in FIG. 4, the upper latch 36 is controlled by an upper latch motor 54 for the cinch and release operation, and the first and second lower latches 38 and 40 are each controlled by two different motors such as cinching motors 50 and 52 for the cinch operation and releasing motors 51 and 53 for the release operation. For example, the electric motors used in the latches 36, 38, and 40 are also the bi-directional motors to control the both rotational directions such as a clockwise (CW) direction and a counterclockwise (CCW) direction. Further, the upper latch 36, the first lower latch 38, and the second lower latch 40 are each engaged with a respective striker installed in the vehicle 10 to lock each of the upper gate 16 and the lower gate 18 in the closed position.

Figure 4A:
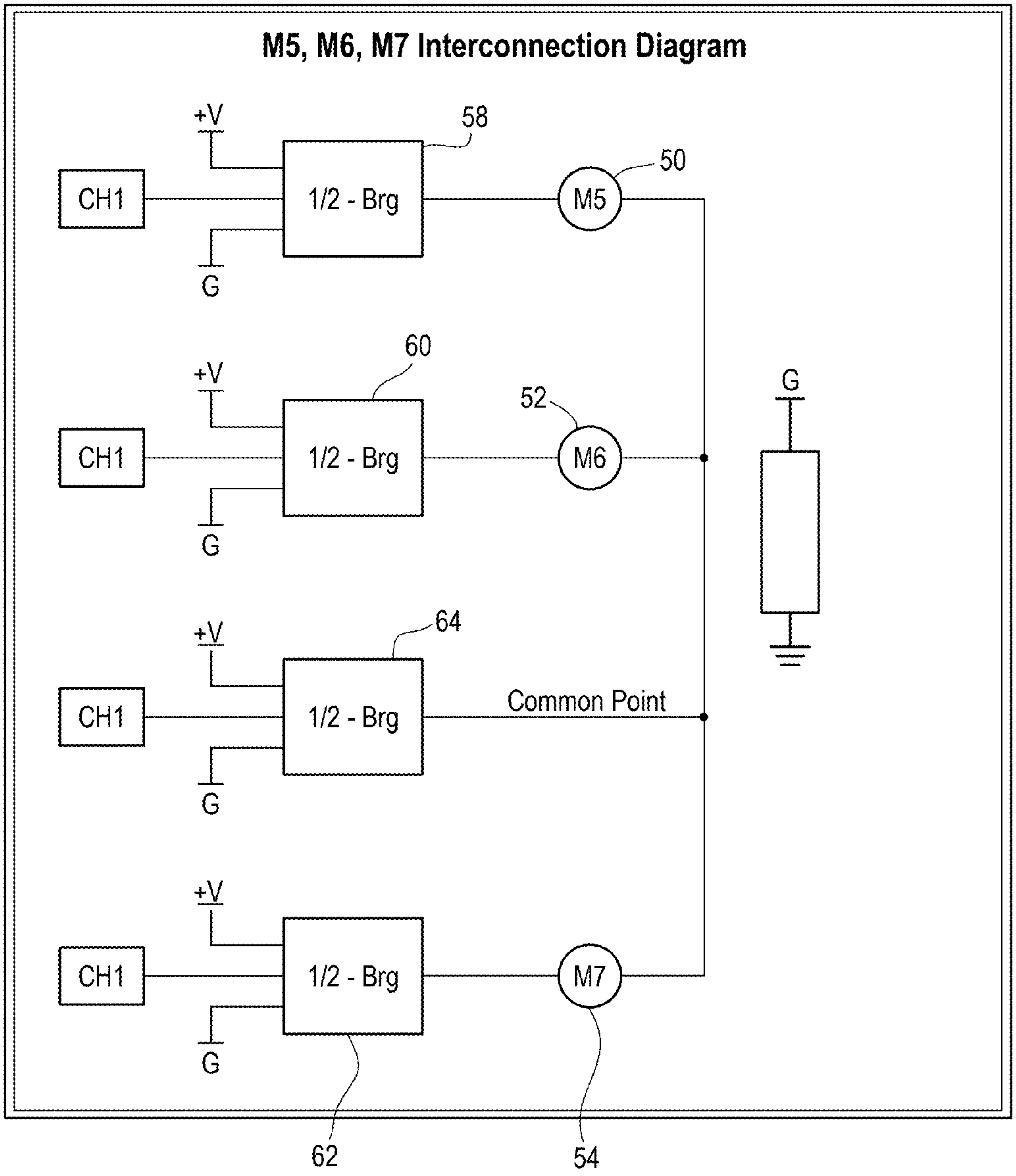
FIG. 4A is an interconnection diagram of three (3) motors.

In general, a bi-directional motor is controlled with 4 MOSFETs. For example, in FIG. 4, the upper and lower actuator motors 46 and 48 are each connected to four (4) MOSFETs such that the actuator motors 46 and 48 are each controlled with a full H-Bridge connection and are independently operated to control each of the upper and lower spindle drives 42 and 44. Unlike the upper and lower actuator motors 46 and 48, the first lower latch cinching motor 50, the second lower latch cinching motor 52, and the upper latch motor 54 are interconnected to one another such that the motors are controlled with eight (8) MOSFETs to perform the cinch operation of the upper latch 36, the first lower latch 38, and the second lower latch 40 instead of twelve (12) MOSFETs. As shown in FIG. 4, each of the upper latch motor 52 and the first and second lower latch cinching motors 52 and 54 is controlled with the respective half-bridge connection 58, 60, and 62, and a common half-bridge connection 64. FIG. 4A shows the interconnection diagram of the three (3) motors 50, 52, and 54 connected with each of the half-bridge connections 58, 60, and 62, and the common half-bridge connection 64.

Figure 5A:
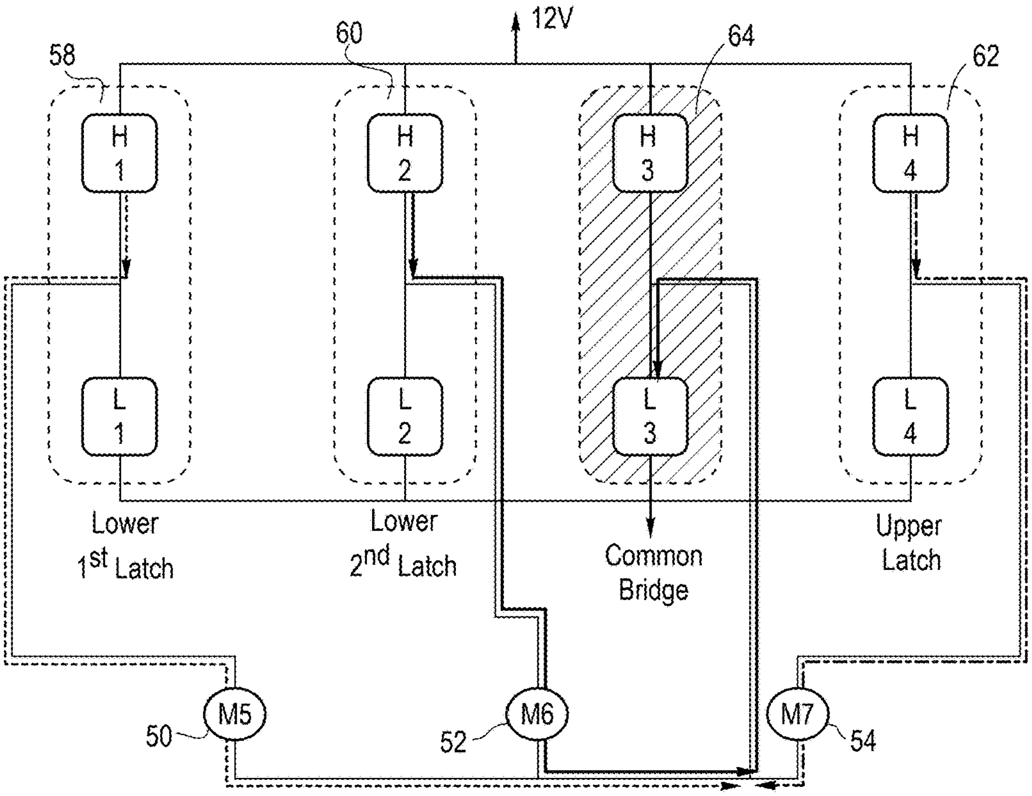
FIG. 5A is a diagram showing three (3) motors connected to a common half-bridge connection in a clockwise (CW) direction.
Figure 5B:
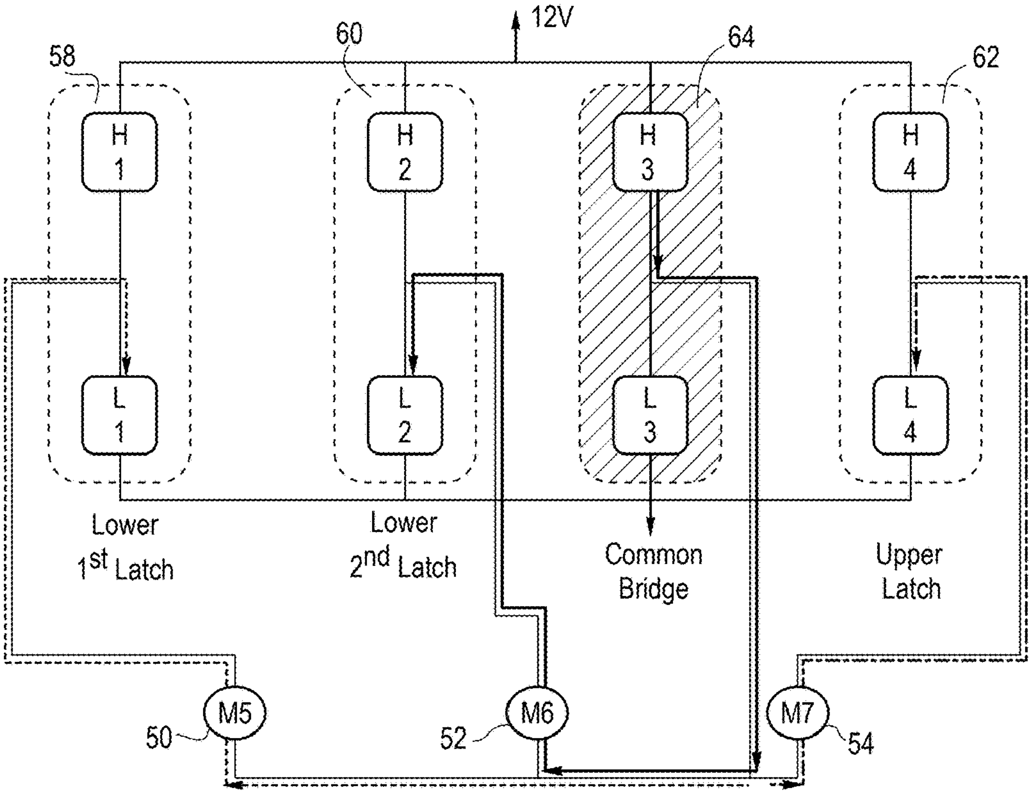
FIG. 5B is a diagram showing three (3) motors connected to the common half-bridge connection in a counterclockwise (CCW) direction.

FIGS. 5A and 5B show the operating topology of the first lower latch cinching motor 50, the second lower latch cinching motor 52, and the upper latch motor 54, which are interconnected to control the cinch operation and the rewind operation of each of the three (3) latches 36, 38, and 40. Each of the first lower latch cinching motor 50, the second lower latch cinching motor 52, and upper latch motor 54 uses the respective half-bridge connection 58, 60, and 62, and the common half-bridge connection 64 such that each of the three motors 50, 52, and 54 is controlled using one full H-bridge connection. FIGS. 5A and 5B show the cinch operation and the rewind (i.e., home) operation of the three latches 36, 38, and 40. In the cinch operation of FIG. 5A, each of the half-bridge connections 58, 60, and 62 connected to the respective motor is switched on a high voltage (H) and the common half-bridge connection 64 is switched on low voltage (L) such that the current flows toward the common half-bridge connection 64 from each of the half-bridge connections 58, 60, and 62 (see arrows in FIG. 5A) to control the rotational direction of the motors (e.g., a clockwise (CW) direction). Further, the cinch operation of the three latches 36, 38, and 40 may be operated simultaneously because each of the motors is controlled by the common half-bridge connection 64.

After completing the cinch operation of the three latches, each motor is not in a position to perform the next operation of the motor. Accordingly, the ECU 34 is configured to reset the position of the motors to perform the next operation, which is defined as a rewind operation of the latches. In the rewind operation of the latches, the motors run in an opposite direction from the rotational direction of the previous operation. As described above, in the cinch operation, the motors connected to the H-bridge connections run in the CW direction such that, in the rewind operation of the latches, the motors run in a counterclockwise (CCW) direction, which is the opposite direction from the cinch operation. As shown in FIG. 5B, each of the half-bridge connections 58, 60, and 62 connected to the respective motor is switched on the low voltage (L) and the common half-bridge connection 64 is switched on the high voltage (H) such that the current flows toward each of the half-bridge connections 58, 60, and 62 from the common half-bridge connection 64 (see arrows in FIG. 5B) to control the rotational direction of the motors (e.g., the counterclockwise (CCW) direction). Also, the rewind operation of the three latches 36, 38, and 40 may be operated simultaneously because each of the motors is controlled by the common half-bridge connection 64.

Due to the common half-bridge connection 64, as shown in FIGS. 5A and 5B and also described above, all of the latches 36, 38, and 40 may work simultaneously in the cinch operation and/or the rewind operation. For example, if any of the latches is doing the rewind operation and other latch starts cinch operation, then the ongoing rewind operation is paused until the cinch operation of the other latch is completed. After completing the cinch operation of the other latch, the paused rewind operation is resumed and also the other latch also starts the rewind operation. In the present disclosure, accordingly, the three latches 36, 38, and 40 may be operated simultaneously in the cinch and/or rewind operations.

Further, when the lower gate 18 is only closed while the upper gate 16 is in the open position, the controller 34 is configured to operate the first and second lower latch cinching motors 50 and 52 to perform the cinch and rewind operations of the first and second lower latches 38 and 40, which is the same way as in the cinch and rewind operations of the three latches including the upper latch 36, the first lower latch 38, and the second lower latch 40. For example, the first lower latch 38 and the second lower latch 40 may be operated simultaneously in the cinch and rewind operations. Further, when the cinch operation of the second lower latch 40 starts in ongoing the rewind operation of the first lower latch 38, the ongoing rewind operation of the first lower latch 38 is stopped and paused, and then the cinch operation of the second lower latch 40 starts and is completed. After the second lower latch 40 completes its cinch operation while the rewind operation of the first lower latch 38 is paused, the rewind operations of the first and second lower latches 38 and 40 may start simultaneously to reset the motors for the next operation.

Figure 6A:
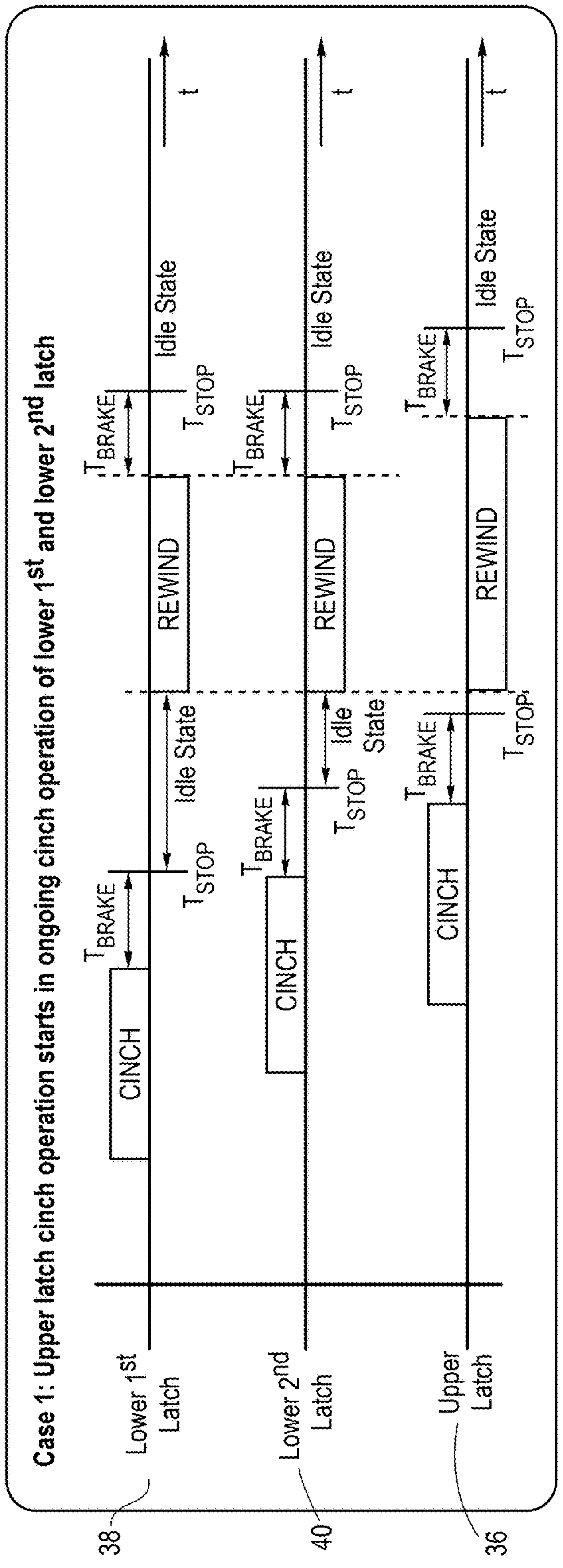
FIGS. 6A-6C are examples of the combined operation of three (3) latches in the drive arrangement of FIG. 4.
Figure 6B:
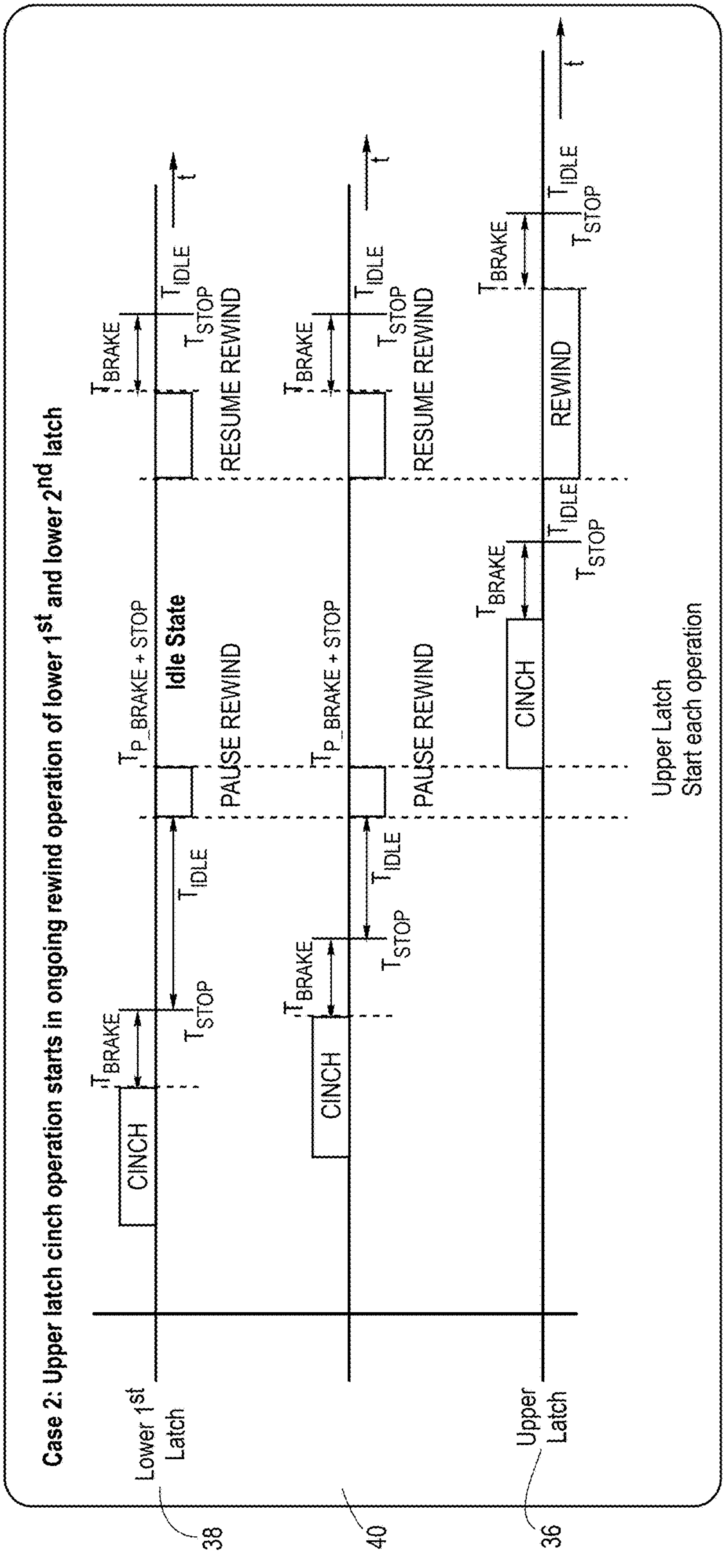
Figure 6C:
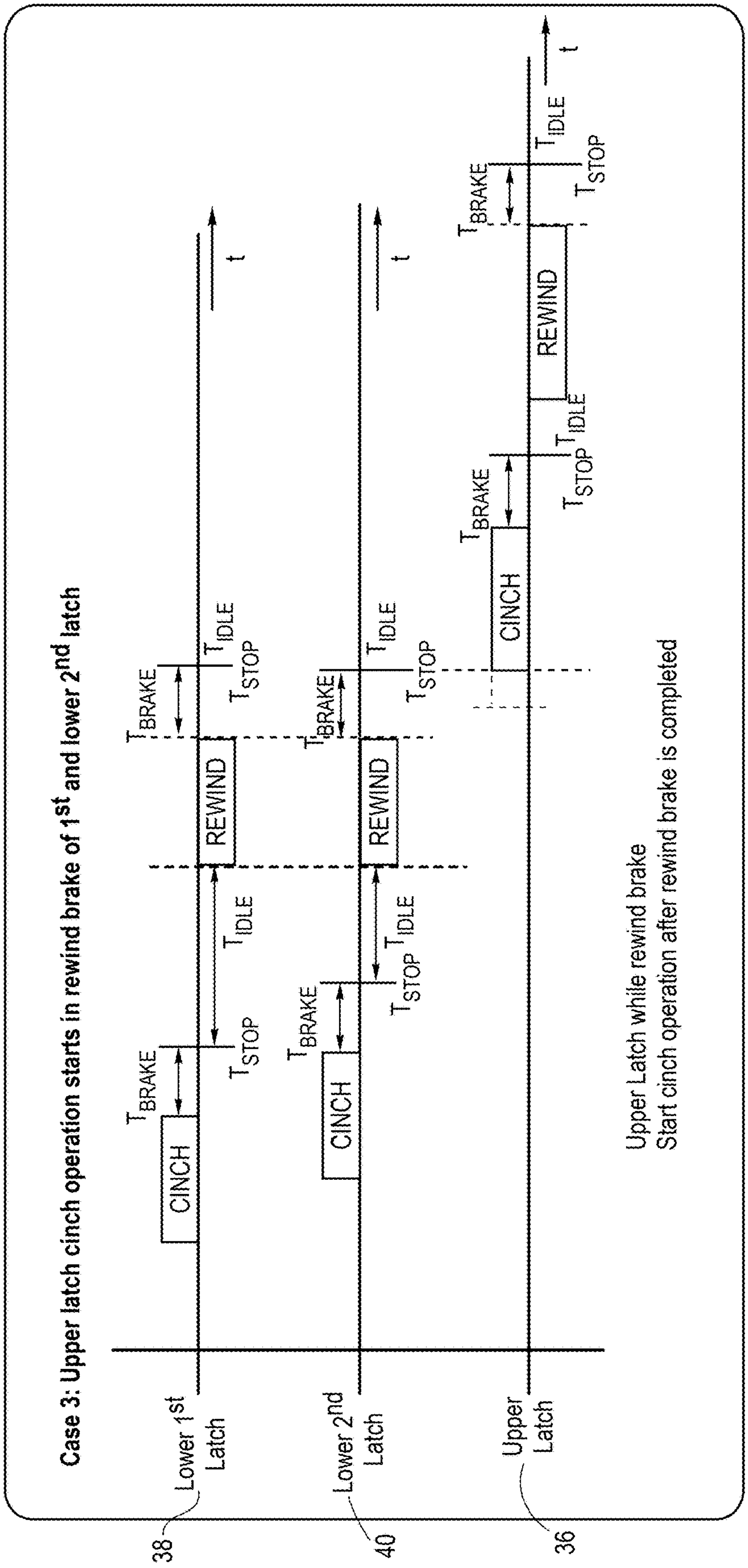

FIGS. 6A-6C show the combined operation scenarios of the three latches 36, 38, and 40 operatively connected with the respective motors 50, 52, and 54. FIG. 6A shows that the cinch operation of the upper latch 36 starts in ongoing cinch operation of the first and second lower latches 38 and 40. In this case, the cinch operations of the three latches 36, 38, and 40 may run simultaneously. After completing the cinch operation of the three latches 36, 38, and 40, the rewind operations of the three latches 36, 38, and 40 may also run simultaneously. FIG. 6B shows that the cinch operation of the upper latch 36 starts in ongoing rewind operation of the first and second lower latches 38 and 40 (i.e., the first and second lower latches are in the primary position, but the upper latch is not in the primary position yet). In this case, the rewind operations of the first and second lower latches 38 and 40 are stopped and paused, and then the cinch operation of the upper latch 36 starts and is completed. After the cinch operation of the upper latch 36 is completed while the rewind operations of the first and second lower latches 38 and 40 are paused, the rewind operations of the first and second lower latches 38 and 40 are resumed and also the rewind operation of the upper latch 36 starts such that the three latches may run simultaneously.

FIG. 6C shows that the cinch operation of the upper latch 36 starts in the rewind operation brake time of the first and second lower latches 38 and 40. In this case, the cinch operation of the upper latch 36 waits and starts after the rewind operation brake time of the first and second lower latches 38 and 40 is passed. In the scenario of FIG. 6C, the first and second lower latches 38 and 40 reach first the primary position and reset the position for the next operation, and then the upper latch reaches its primary position and resets the position for the next operation. Further, the combined operation scenarios of the three latches using the common half-bridge connection are not limited to the scenario examples described above and shown in FIGS. 6A-6C such that the various operation scenarios of the three latches using the common half-bridge connection may be occurred in the drive arrangement of the present disclosure.

Figure 7:
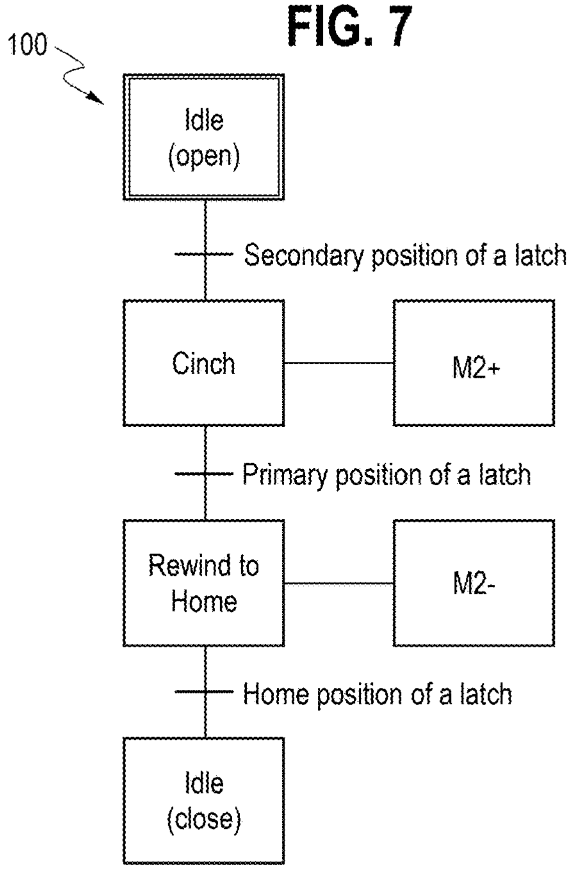
FIG. 7 is a flow diagram of the drive arrangement operation of FIG. 4.
Figure 8:
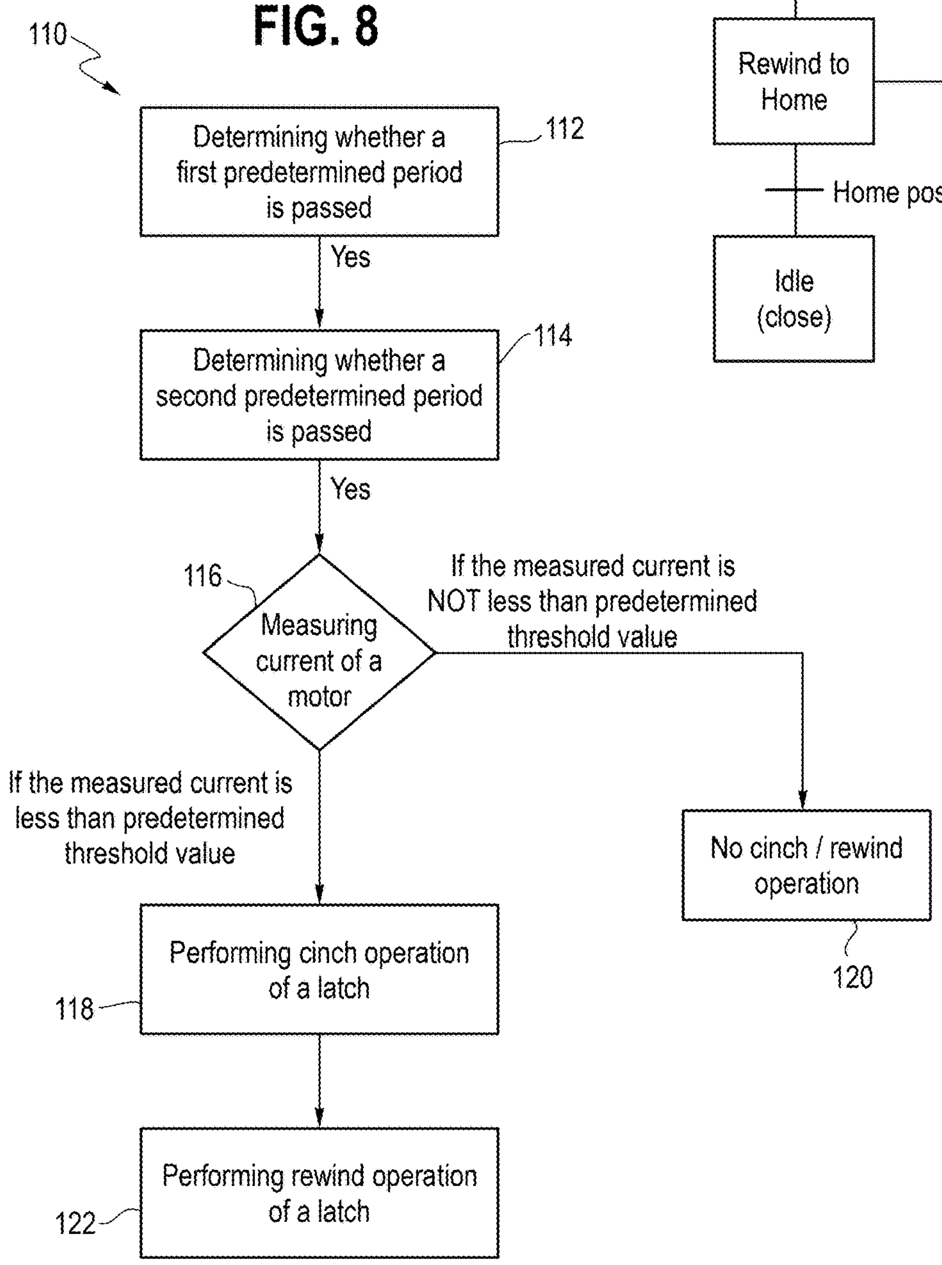
FIG. 8 is a flow diagram of the drive arrangement operation including a diagnosis operation of the motors.

FIG. 7 shows a flow chart 100 of the cinch and rewind operations of one of the first and second lower latches 38 and 40 using the common half-bridge connection in the present disclosure. As shown in the flow chart 100 and also described above, each of the first and second lower latch cinching motors 50 and 52 connected to the respective half-bridge connection and the common bridge connection may run simultaneously in the CW direction such that the latches are moved to primary position from the secondary position defined as the cinch operation. After the cinch operation of the latches, the motors also runs simultaneously in the CCW direction such that the latches are moved to home position from the primary position defined as the rewind operation. FIG. 8 shows a flow chart 110 showing a diagnosis step whether the cinch operation of each of the lower latches 38 and 40 is possibly performed by checking current value in the H-bridge connection having the respective half-bridge connection and one common bridge connection.

As shown in FIG. 8, the ECU (i.e., controller) 34 is configured to check current flowing through the H-bridge connection connected to each of the lower latch cinching motors 50 and 52 to perform the cinch operation of the lower latches 38 and 40. In steps 112 and 114 of the diagnosis process, the controller 34 is configured to send a 'wait' signal for a predetermined period (e.g., around 40 msec), and then send another 'wait' signal for an additional predetermined period (e.g., around 40 msec) before checking the current flowing in the H-bridge connection of each of the motors. In step 116 of the diagnosis process, the controller 34 is configured to measure the current value flowing through the H-bridge connection connected to each of the lower latch cinching motors 50 and 52. Further, the controller is configured to determine whether the measured current is less than a predetermined threshold value (e.g., around 8A) or not.

In step 118, if the controller 34 determines that the measured current is less than the predetermined threshold value, the controller is configured to perform the cinch operation of each of the lower latches. In step 120, however, if the controller 34 determines that the measured current is not less than the predetermined threshold value, the cinch operation of each of the lower latches cannot be performed. In step 122, further, the controller 34 is configured to perform the rewind operation of each of the lower latches after the cinch operation of the lower latches is completed.

The foregoing description of various forms of the invention has been presented for purposes of illustration and description. It is not intended to be exhaustive or to limit the invention to the precise forms disclosed. Numerous modifications or variations are possible in light of the above teachings. The forms discussed were chosen and described to provide the best illustration of the principles of the invention and its practical application to thereby enable one of ordinary skill in the art to utilize the invention in various forms and with various modifications as are suited to the particular use contemplated. All such modifications and variations are within the scope of the invention as determined by the appended claims when interpreted in accordance with the breadth to which they are fairly, legally, and equitably entitled.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

PARTS LIST

10 vehicle
11 splitgate system
12 rear gate assembly
14 cabin
16 upper gate
18 lower gate
20 cargo area
22 upper pivot axis
24 lower pivot axis
26 upper actuator
28 lower actuator
30 upper distal end
32 lower distal end
34 electronic control unit (ECU)
36 upper latch
38 first lower latch
40 second lower latch
42 upper spindle drives
44 lower spindle drives
46 upper actuating motor
48 lower actuating motor
50 first lower latch cinching motor
51 first lower latch releasing motor
52 second lower latch cinching motor
53 second lower latch releasing motor
54 upper latch motor
58 first lower latch half-bridge connection
60 second lower latch half-bridge connection
62 upper latch half-bridge connection
64 common half-bridge connection
100 flow chart
110 flow chart with diagnosis steps

What is claimed is:

1. A drive arrangement for a splitgate system having an upper gate and a lower gate for a vehicle, the drive arrangement comprising:

an upper latch included in the upper gate and operatively connected with an upper latch motor;

a first lower latch included in the lower gate and operatively connected with a first lower latch cinching motor;

a second lower latch included in the lower gate and operatively connected with a second lower latch cinching motor;

a controller configured to operate each of the upper latch motor, the first lower latch cinching motor, and the second lower latch cinching motor to perform a cinch operation of the upper latch, the first lower latch, and the second lower latch, wherein the upper latch motor, the first lower latch cinching motor, and the second lower latch cinching motor are operatively interconnected to control a rotational direction of the motors such that each of the three motors uses a respective half-bridge connection and a common half-bridge connection to make a H-bridge connection.

2. The drive arrangement of claim 1, wherein the upper latch motor, the first lower latch cinching motor, and the second lower latch cinching motor are operatively interconnected with eight (8) MOSFETs to control the rotational direction of each motor.

3. The drive arrangement of claim 1, wherein, in the cinch operation, the controller is configured to switch on a high voltage (H) in the respective half-bridge connection of the motors and a low voltage (L) in the common half-bridge connection such that current flows toward the common half-bridge connection from each of the half-bridge connections to operate the motors.

4. The drive arrangement of claim 3, wherein, in the cinch operation, each of the motors runs in a clockwise (CW) direction such that the latches are moved to a primary position from a secondary position.

5. The drive arrangement of claim 1, wherein the controller is configured to further operate each of the motors to perform a rewind operation for resetting a position of the motors.

6. The drive arrangement of claim 5, wherein, in the rewind operation, a rotational direction of the motors is an opposite from the rotational direction of the motors in the cinch operation.

7. The drive arrangement of claim 5, wherein, in the rewind operation, the controller is configured to switch on a low voltage (L) in the respective half-bridge connection of the motors and a high voltage (H) in the common half-bridge connection such that each current flows toward the respective half-bridge connection from the common half-bridge connection to operate the motors.

8. The drive arrangement of claim 7, wherein, in the rewind operation, each of the motors runs in a counterclockwise (CCW) direction such that the latches are moved to a home position from a primary position.

9. The drive arrangement of claim 1, wherein when the controller determines that a cinch operation of the upper latch starts in ongoing cinch operations of the first and second lower latches, the controller is configured to perform the cinch operations of the three latches.

10. The drive arrangement of claim 1, wherein when the controller determines that a cinch operation of the upper latch starts in ongoing rewind operations of the first and second lower latches, the controller is configured to stop and wait the rewind operations of the first and second lower latches until the upper latch completes the cinch operation.

11. The drive arrangement of claim 10, wherein when the cinch operation of the upper latch is completed, the controller is configured to resume the rewind operations of the first and second lower latches and also perform a rewind operation of the upper latch.

12. The drive arrangement of claim 1, further comprising a first lower latch releasing motor and a second lower latch releasing motor to unlock the respective first and second lower latches such that the first and second lower latches are moved to a secondary position from a primary position.

13. The drive arrangement of claim 1, further comprising a pair of upper spindle drives to move the upper gate between an open position and a closed position, and a pair of lower spindle drives to move the lower gate between an open position and a closed position.

* * * * *